(12) United States Patent
Klein et al.

(10) Patent No.: US 11,073,980 B2
(45) Date of Patent: Jul. 27, 2021

(54) USER INTERFACES FOR BI-MANUAL CONTROL

(71) Applicant: Microsoft Technology Licensing, LLC, Redmond, WA (US)

(72) Inventors: Christian Klein, Duvall, WA (US); Andrew S. Glass, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/279,988

(22) Filed: Sep. 29, 2016

(65) Prior Publication Data
US 2018/0088792 A1 Mar. 29, 2018

(51) Int. Cl.
*G06F 3/0488* (2013.01)
*G06F 3/01* (2006.01)
*G06F 3/0484* (2013.01)

(52) U.S. Cl.
CPC .......... *G06F 3/04883* (2013.01); *G06F 3/017* (2013.01); *G06F 3/0484* (2013.01); *G06F 2203/04808* (2013.01)

(58) Field of Classification Search
CPC ............... G06F 3/04883; G06F 3/0484; G06F 2203/04808
See application file for complete search history.

(56) References Cited

U.S. PATENT DOCUMENTS

| | | | |
|---|---|---|---|
| 7,295,191 B2 | 11/2007 | Kraus et al. | |
| 7,705,830 B2 | 4/2010 | Westerman et al. | |
| 7,849,421 B2 | 12/2010 | Yoo et al. | |
| 8,487,888 B2 | 7/2013 | Wigdor et al. | |

(Continued)

FOREIGN PATENT DOCUMENTS

EP 2720110 A2 4/2014

OTHER PUBLICATIONS

Palleis, et al., "Exploring Two-handed Indirect Multi-touch Input for a Docking Task", In Proceedings of the International Working Conference on Advanced Visual Interfaces, Jun. 7, 2016, pp. 36-39.

(Continued)

*Primary Examiner* — Andre L Matthews
(74) *Attorney, Agent, or Firm* — Newport IP, LLC; Scott Y. Shigeta

(57) ABSTRACT

Techniques for bi-manual control of an operation may allow gestural input for the operation to be inputted blindly with one hand while a user's attention remains on the other hand. An operation invoked and controlled by the gestural input may automatically associate with an operation controlled by the other hand. The gestural input may facilitate blind control of the operation by being able to be initially recognized without regard for the scale, orientation, and/or location of the invoking gestural input. Moreover, scale and/or orientation of the operation may be determined by the gestural input. Changes in scale and/or orientation of the gestural input during the blind operation may change the scale and/or orientation of the operation. The operation may manifest by displaying corresponding graphics at a location independent of the gestural input or by associating functionality of the blind operation with an operation performed by the other hand.

20 Claims, 15 Drawing Sheets

(56) References Cited

U.S. PATENT DOCUMENTS

| | | |
|---|---|---|
| 8,665,238 B1 | 3/2014 | Gossweiler et al. |
| 8,745,541 B2 | 6/2014 | Wilson et al. |
| 8,760,426 B1 | 6/2014 | Strand et al. |
| 8,997,025 B2 | 3/2015 | Chiu et al. |
| 9,239,648 B2 | 1/2016 | Smus |
| 9,348,458 B2 | 5/2016 | Hotelling et al. |
| 2005/0052427 A1 | 3/2005 | Wu et al. |
| 2006/0125803 A1* | 6/2006 | Westerman ......... G06F 3/04883 345/173 |
| 2010/0309140 A1* | 12/2010 | Widgor ............... G06F 3/04883 345/173 |
| 2011/0093821 A1* | 4/2011 | Wigdor ............... G06F 3/04883 715/863 |
| 2011/0134047 A1* | 6/2011 | Wigdor ............... G06F 3/04883 345/173 |
| 2011/0209088 A1 | 8/2011 | Hinckley et al. |
| 2012/0154295 A1* | 6/2012 | Hinckley ............ G06F 3/04883 345/173 |
| 2013/0067392 A1* | 3/2013 | Leonard ................ G06F 3/0486 715/784 |
| 2013/0335333 A1 | 12/2013 | Kukulski et al. |
| 2014/0208275 A1* | 7/2014 | Mongia ............... G06F 3/04842 715/863 |
| 2015/0040040 A1* | 2/2015 | Balan ................... G06F 3/0482 715/762 |
| 2015/0169165 A1 | 6/2015 | Bacus |

OTHER PUBLICATIONS

"International Search Report and Written Opinion Issued in PCT Application No. PCT/US2017/051960", dated Jan. 22, 2018, 14 Pages.

* cited by examiner

| SUMMON GESTURE | SELECTION FEATURE | ORIENTATION FEATURE | SCALE FEATURE | CONTROL FEATURE |
|---|---|---|---|---|
| N-FINGER TAP | N | LINE OF TAP POINTS, OR PERPENDICULAR | DISTANCE OUTERMOST FINGERS | FINGER(S) MOVE |
| N-FINGER SWIPE | 2+ FINGERS + SWIPE (OR, N) | DIRECTION OF SWIPE | FINGER SEPERATION OR SWIPE DISTANCE | FINGERS MOVE |
| N-FINGER ROTATE | MULTIFINGER ROTATION (AND/OR N) | DIRECTION OF SWIPE | FINGER SEPERATION OR SWIPE DISTANCE | FINGERS MOVE |
| ARBITRARY GEOMETRY/ MOVEMENT | N/A | LINE THROUGH START AND STOP POINT | N/A | TAPS INSIDE DEFINED ZONE |
| N-FINGER DWELL | N | FINGER ALIGNMENT | CONTROL RANGE (EXTENT) DEFINED BY OUTER FINGERS | N-FINGERS SLIDE |
| DWELL FEATURE | N/A | ALIGNED WITH LINE OF DWELL POINTS | SCALED TO DWELL POINTS | TAPS IN PREDEFINED AREAS |
| ... | ... | ... | ... | ... |

USER INTERFACES FOR BI-MANUAL CONTROL

BACKGROUND

As hardware for directing input to computers and for displaying information from computers has advanced, techniques for human-computer interactions have lagged. For example, pointer input devices such as sensing surfaces have enabled multiple simultaneous input points to be manipulated by a user. Furthermore, displays have become larger, some even larger than a human arm span. As only the inventors have recognized, large displays and improved hardware software support for bi-manual input highlight a general problem with input and visual attention. Although user interfaces have been designed to enable concurrent bi-manual manipulations, prior bi-manual input techniques have required users to constantly shift their visual attention between hands that are concurrently manipulating a user interface.

FIG. 1 shows how a user's 100 visual attention inefficiently shifts between a dominant hand 102 and a non-dominant hand 104, even though the hands are directing operations to a same task. In FIG. 1 the user is interacting with a user interface displayed on a display 106. The display 106 includes an input sensing surface or layer. To accomplish the task, the user 100 needs to simultaneously perform a first operation 110 and a second operation 112 (graphics of the respective operations are represented by the dashed circles). The first operation 108 requires sequential manual interactions A, C, and E. The second operation 112 requires sequential interactions B and D. The overall sequence of manual interactions is A through E. Initially, the user's 100 visual attention is on the dominant hand 102 to perform step A. Then, interaction B requires the user 100 to shift visual attention to the non-dominant hand 104. This back-and-forth shifting of visual attention from one operation or display region to another is inefficient. Each shift of visual attention disrupts the flow of activity and requires a mental reorientation to precisely focus the visual attention, perhaps adjust to a different mode of input or different type of graphic control, etc.

In addition, operations or modes of interaction and control have been not optimized for the non-dominant hand 104. A user interface element (e.g., a control) might be designed to require complex types of inputs that require fine motor control and close visual attention to a control's graphic interactive elements such as buttons, sliders, and the like. User interface elements have not been designed in ways that are suitable for use by a non-dominant hand. For instance, user interface elements have not been designed in ways that are suitable for blind operation, that is, operation with one hand (e.g., non-dominant) while visual attention remains on the other hand.

Described herein are user interface elements suitable for blind operation and for bi-manual inputting without the need to shift visual attention between hands.

SUMMARY

The following summary is included only to introduce some concepts discussed in the Detailed Description below. This summary is not comprehensive and is not intended to delineate the scope of the claimed subject matter, which is set forth by the claims presented at the end.

Techniques for bi-manual control of an operation may allow gestural input for the operation to be inputted blindly with one hand while a user's attention remains on the other hand. An operation invoked and controlled by the gestural input may automatically associate with an operation controlled by the other hand. The gestural input may facilitate blind control of the operation by being able to be initially recognized without regard for the scale, orientation, and/or location of the invoking gestural input. Moreover, scale and/or orientation of the operation may be determined by the gestural input. Changes in scale and/or orientation of the gestural input during the blind operation may change the scale and/or orientation of the operation. The operation may manifest by displaying corresponding graphics at a location independent of the gestural input (e.g., relative to the other hand) or by associating functionality of the blind operation with an operation performed by the other hand.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 6 shows a table of other examples of blind gestures.

DETAILED DESCRIPTION

Figure 2:
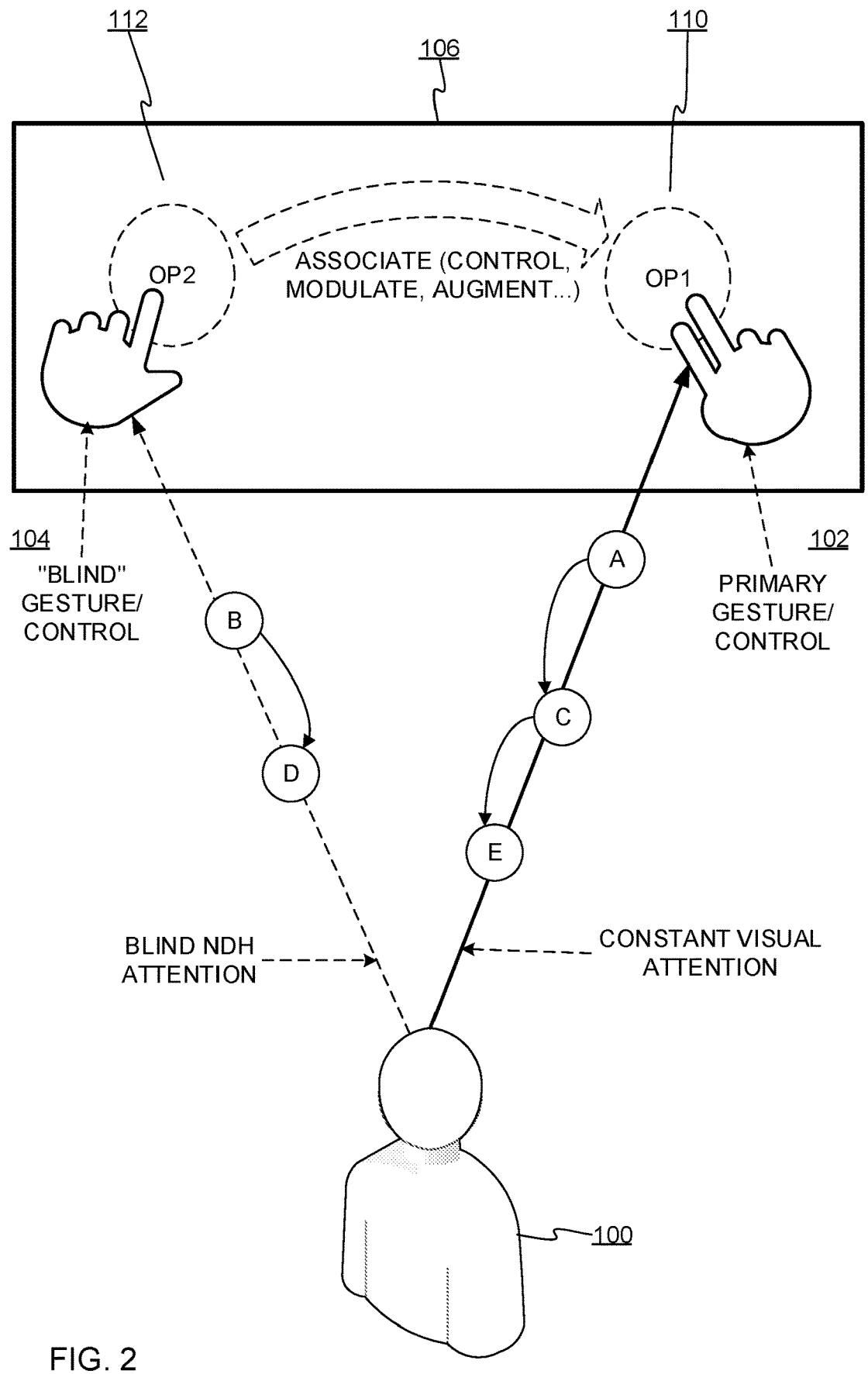
FIG. 2 shows how enabling blind use of the non-dominant hand can improve a user's efficiency.

FIG. 2 shows how enabling blind use of the non-dominant hand 104 can improve the user's 100 efficiency. Any of a variety of embodiments described herein are presumed to enable blind invocation and operation of a user interface element, sometimes in conjunction with other activity. The term "blind" is used herein to describe a design and intent and does not connote any particular technical requirement or physical impairment. Embodiments may be described with reference to "dominant" and "non-dominant" hands. This also reflects a design intent and perhaps optimal usage scenarios. However, the embodiments described herein need not discern whether input is from a dominant or non-dominant hand. That is, anywhere a hand is referred to as "dominant" (or "non-dominant"), the non-dominant (or dominant) hand may also be used.

Figure 1:
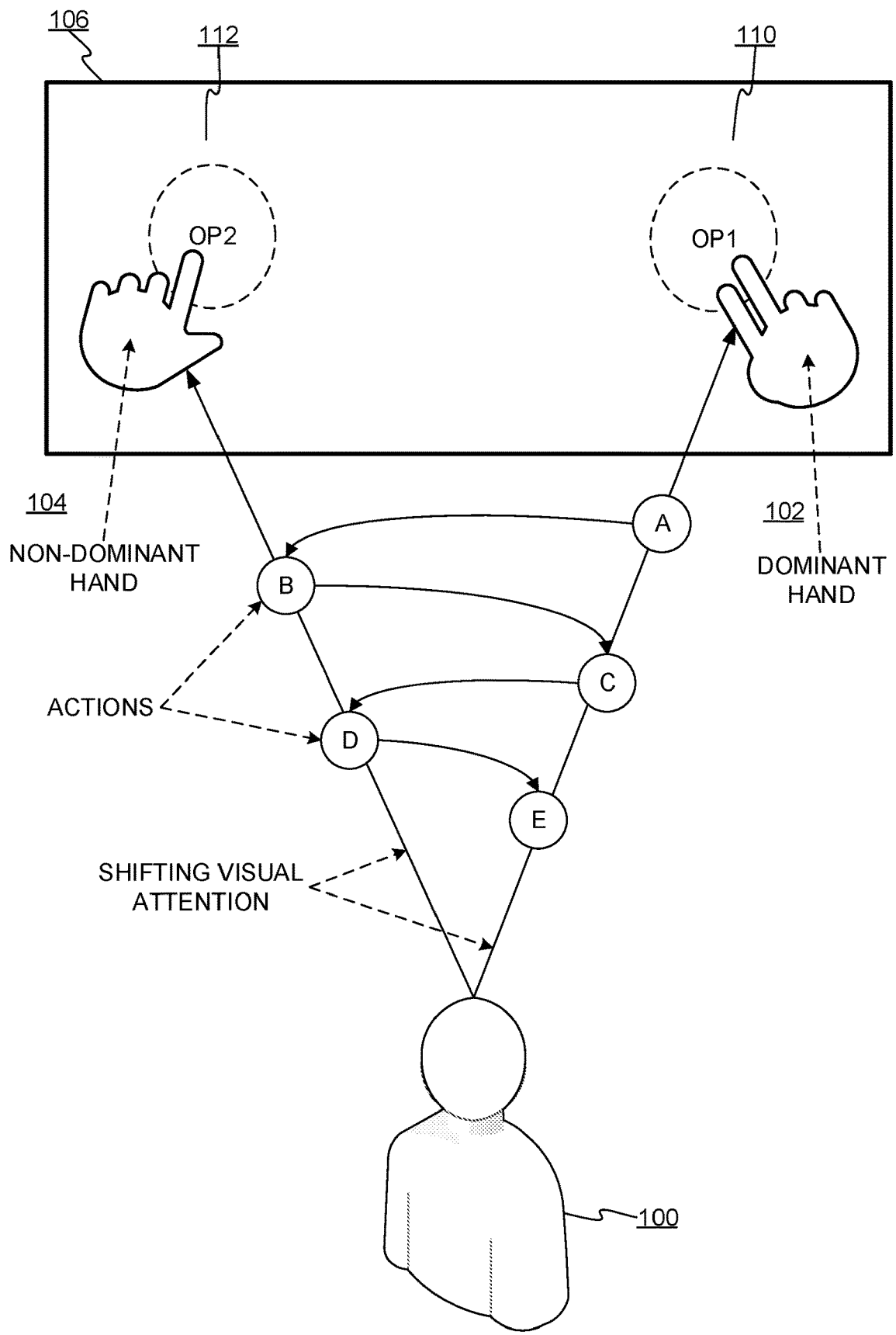
FIG. 1 shows how a user's visual attention inefficiently shifts between a dominant hand and a non-dominant hand.

The embodiments described herein involve blind user interface elements. Blind interface elements include gestures and controls which may or may not have accompanying graphic elements. The blind gestures both summon and operate the blind controls, which are also referred to as blind widgets. Referring to FIG. 2, as in FIG. 1, the dominant hand 102 is initially performing interaction A of the primary or first operation 110. The user's visual attention remains on the region near the dominant hand 102. For example, the user may be looking at a section of a document that is being manipulated by a touch of the dominant hand 102. At the same time, when the second operation is needed, the non-dominant hand 104 performs a blind summoning gesture, examples and features of which are described below. The blind summoning gesture starts the second operation 112, for instance, by instantiating or activating a blind control (not shown) that will be manipulated in blind fashion by the non-dominant hand 104.

Features and embodiments described below allow interaction B to be directed to the blind control by the non-dominant hand 104 while the user's visual attention remains on the region where the first operation is occurring. As can be seen in FIG. 2, as interactions C, D, and E are performed the user's visual attention is able to stay focused on the first operation 110 and the fine motor control of the dominant hand 102. At the same time, less demanding blind manual control of the blind control performs the second operation 112. In some embodiments, the second operation 112, e.g. in the form of the blind control, graphically and/or functionally associates with the first operation 110. Although the blind control is manipulated by the non-dominant hand 104 away from the area of visual attention, the non-dominant hand 104 is nonetheless brought to bear on the locus of the first operation 110.

Figure 3:
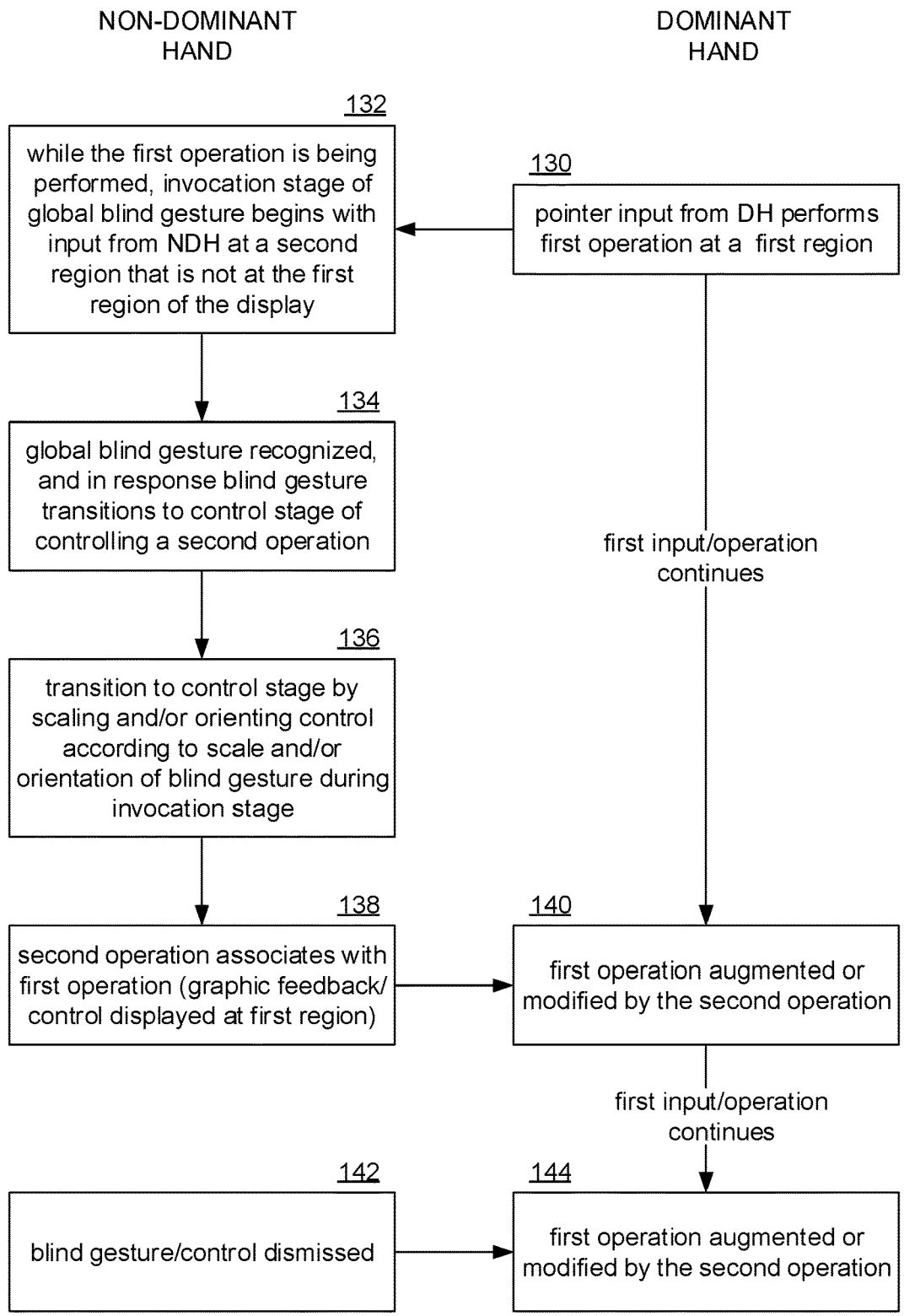
FIG. 3 shows a process for enabling blind input from a non-dominant hand to supplement an operation being performed by a dominant hand.

FIG. 3 shows a process for enabling blind input from a non-dominant hand to supplement an operation being performed by a dominant hand. Initially, at step 130, the user's visual attention is at the dominant hand. The user may be actively inputting input with their dominant hand. Alternatively, it may be inferred that the user's attention is directed to a first region or element based on indicia of recent activity, selection of the element or first region, properties of user interface elements, and other methods described below.

The user input of the dominant hand and the non-dominant hand is linked to the display 106. For example, the display 106 might include a touch sensing element which senses proximity, pressure, and/or contact of a physical pointer such as a digit, a stylus, etc. User input can instead by provided by a mouse, a touch pad that is not part of the display, a camera, a three-dimensional sensor, and so forth. Any combination of input devices capable of sensing manually manipulated two-dimensional or three-dimensional input points may be used. A secondary computing device such as a touch-sensitive handheld device can also serve as a secondary input device for a primary computing device displaying to the display 106. In addition, the embodiments described herein are readily applicable to multi-display arrangements, including an arrangement of multiple touch-sensitive displays under the control of one operating system, perhaps with one hand operating each surface. Any reference herein to a single display and/or input device is deemed to also refer to multiple displays and/or input devices. Some embodiments may be particularly applicable when two input devices are used since coordination of the hands may be more difficult.

Returning to FIG. 3, at step 132, while the first operation is being performed by or associated with the dominant hand, a blind invocation gesture is performed. One or more blind gestures are implemented in any way that gives their recognition and subsequently controlled actions precedence over other gestures such as gestures implemented by applications or other non-global user interface elements. In one embodiment, as described further below, the blind gestures are implemented as system affordances and are part of the operating/windowing system. In another embodiment, the blind gestures are implemented as an application or service executing in the background. Regardless, a module has an opportunity to receive and analyze inputted gestures to determine which are blind gestures and act on them when they are recognized. Gestural inputs that are not determined to be blind gestures are passed down to lower-precedent modules or applications in ordinary fashion. The blind gesture recognition may be implemented over an entire display regardless of the type of input devices available for input. In one embodiment, an input device is a sensing display and blind gestures are global in that they may be inputted at any display location at any time. In another embodiment, blind gestures are quasi-global and are recognized in a limited area and perhaps under limited conditions, such as when any arbitrary application is active or when any arbitrary application is in full-screen mode. Blind gestures may at times be globally available and at other times unavailable or have limited space/time availability.

Some blind gestures may be designed to activate user interface behavior that works in combination with a user activity that is already underway, including an activity controlled by gestural input that is inputted concurrently with a blind gesture. For convenience, the blind gesture and corresponding user interface behavior (or operation) will be referred to as secondary input that is inputted at a second region, and the user activity (operation) that is combined with the blind gesture will be referred to as primary input that is inputted at a first region. Referring again to step 132, the blind gesture is inputted concurrently with a first operation that is underway at a first region, and the blind gesture is inputted at a second region to carry out a second operation. The blind (second) gesture and second operation may combine with the first operation to control, modify, or supplement the first operation.

At step 134, after a blind gesture is recognized, the blind gesture transitions to a control stage. Blind gestures are implemented in two stages. First, during an invocation stage, an initial blind gesture is recognized. That is, initial features of an inputted blind gesture are mapped to predefined features to trigger the gesture, and later inputted features map to control behavior. After invocation, the blind gesture enters a control stage during which gestural input is associated with and/or continues the input that was recognized at the invocation stage. For example, a certain touch pattern might invoke a blind gesture, and, after this invocation, the control stage begins by either continuing the touches of the touch pattern or by entering a mode where further input is for control until the blind gesture is implicitly or explicitly dismissed or deactivated. Note that for discussion inputs may be referred to as "touches". However, equivalent types of pointer input discussed above are equally applicable.

At step 136, the control stage of a blind gesture is entered. To facilitate blind invocation and operation, features of the invocation gesture input may be used to configure the control stage. Any unconstrained or user-determinable features of a blind gesture's invocation stage can be used as respective parameters that configure the control stage. For example, if the orientation for recognizing a blind gesture is unconstrained and the defining features of the invocation stage can be entered at any orientation relative to the display, then the orientation of the invocation stage can be determined and used to configure an orientation of the control stage. At step 136, any such parameters of the invocation stage are used to configure the control stage. Configuring a control stage is described further below.

At step 138 the second operation (or widget/control) which is under the control of the control stage of the blind gesture, may associate with the first operation. The association can be implemented in a variety of ways with a variety of effects. For example, a notification event may be passed down through a tree of user interface elements in the same known ways that an operating system dispatches other input and graphics events to applications. An event may be passed to whichever application has a user interface element under the second region where the blind gesture was invoked. Another useful pattern is to pass the event to the application where the non-blind (the dominant hand) gesture is being invoked. This is useful because the dominant hand location is more likely correlated with the user's visual attention and their active task. The blind gesture in this scenario may be invoked above a different (likely unrelated) application, which does not receive the input event. Any method of inter-process communication may be used to inform an application that a blind gesture has been invoked.

The association between the first operation and the blind gesture may manifest in a number of ways. In one embodiment, control events generated by blind input of the control stage are passed to the associated application, and the application determines how the control events are to be used in combination with the first operation. In another embodiment, an application may receive an invocation event and in response bind a method or property of an object involved in the first operation to the control, thus causing the control events to directly manipulate the bound method or property. In yet another embodiment, the association is merely graphic and the blind control does not communicate with any applications. It is also possible to have functionality of the blind operation associate with the first operation in one way (e.g., at the application level) while graphics of the blind operation associates with the first operation in another way (e.g., at a location of the dominant hand).

At step 140 the first operation continues, but augmented, modified, or controlled by the second operation (the blind gesture). At step 142, the blind gesture/control is explicitly or implicitly dismissed, and at step 144 a notification may be provided to the second operation to handle any necessary adjustments. The blind control may be dismissed explicitly by invoking a new blind gesture, by inputting a special dismissal gesture, which might be the same as the invocation gesture, or by invoking a different blind gesture. The blind control may be dismissed implicitly according to conditions such as lack of manipulation of the blind control for a pre-defined period of time, an external event, a change in the associated first operation or its application (e.g., an object bound to the blind control is disposed), etc.

Figure 4:
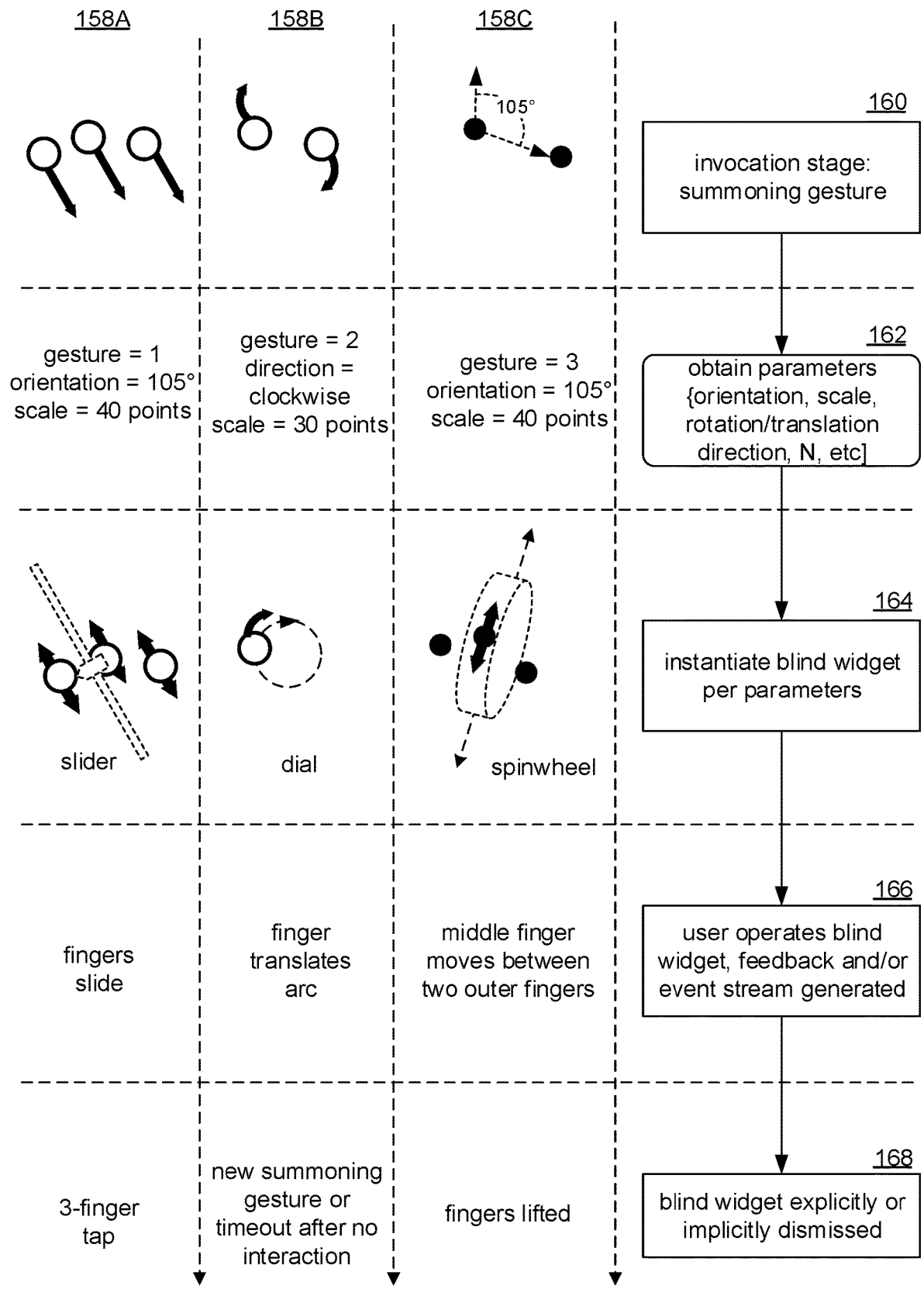
FIG. 4 shows examples of blind gestures and their stages.

FIG. 4 shows example blind gestures 158A, 158B, 158C and their stages. As noted above, an operating system, background process/server, graphical user shell or the like is coded for recognizing gestures using known recognition techniques. At an invocation stage 160, input events or messages are received from the operating system's input stack and recognized. The input may be streams of points, each having a two or three dimensional input point, a timestamp, an identifier identifying which input pointer (e.g., finger) inputted the point, and/or other input parameters. The input events can instead be higher-level constructs such as strokes, lines, taps, tap-and-holds, or other parameterizations of point-based input. When the input is received, the features of the input are mapped to the features of one or more blind invocation gestures. If other non-blind global gestures need to be recognized, the blind gestures will have features that disambiguate them from other global gestures. Any gestural features may be used. A first blind gesture 158A might have invocation features such as a swipe of a certain number of input pointers (e.g., contacts, fingers, physical pointers, etc.). A second blind gesture 158B might be a number of pointers (two) moving rotationally. A third blind gesture 158C might be defined as two pointers dwelling for a threshold duration. Additional examples are discussed with reference to FIG. 6.

At a next stage 162, one or more parameters of the invocation gesture are obtained. The parameters are determined by how the input pointers are arranged and possibly manipulated by the user. Any type of parameter may be obtained, including the existence of movement or rotation, scale, speed, a number of features, a length of time, an order of taps, etc. Not all possible parameters need to be used for all blind gestures. The first example has both an orientation parameter and an "N" parameter, which is the number of input pointers concurrently swiped. The orientation parameter is the direction of the swipe of the N fingers. The second example has a scale parameter, a rotation direction parameter (or just a rotation Boolean flag). The third example has an orientation defined by a line between the two dwell points and a scale defined by the distance between the dwell points.

At an activation or instantiation stage 164, a blind control or widget is instantiated (or activated) and then configured according to any relevant invocation parameters. As mentioned above, a blind widget or control is an explicit or implicit object that in some ways might mimic a physical control. In the first example the control is a slider, in the second it is a dial, and in the third it is a spinwheel. The blind control may or may not be represented by a corresponding graphic at the first region where invocation occurs. In one embodiment, a graphic is displayed during a learning phase to help the user learn the blind gesture. To elaborate, once the system detects that the user has successfully used the blind gesture a certain number of times, or once the user explicitly indicates that the learning graphic is no longer needed, the graphic is no longer displayed on subsequent invocations.

Preferably, the invocation of a blind gesture determines how the corresponding blind control is to be interactively manipulated. In the first example, the orientation of the blind slider corresponds to the orientation of the invoking swipe. In the second example, the rotational manipulation of the blind dial corresponds to the rotational invocation. In the third example, the spinwheel is "spun" by swipes of an input pointer between the two invocation dwell-points and in a direction perpendicular to the direction of a line on which the dwell-points lie. Scaling and/or orienting a blind control according to the scale and/or orientation of the corresponding invocation gesture can be particularly helpful for blind operation. The user's input pointers (e.g., fingers) are already in a known orientation and position so no physical reorienting or repositioning is needed. Also, presumably the user has inputted the invocation gesture in a convenient or comfortable physical position. If a blind control is scaled according to the scale of its invocation gesture then the user's input pointers are presumably in a "ready position" with respect to the blind control, again minimizing or eliminating any need to adjust the physical input implements and hence look away from the primary operation. In short, the blind control is activated or instantiated in a state amenable to immediate manipulation.

At the blind control stage 166, the user manipulates the blind control. Although perhaps configured and used in unique ways as discussed herein, the blind controls are generally manipulated in the same way known controls are manipulated. In some implementations, the blind controls may be operated in the same ways as existing types of controls. However, blind controls may be suited to blind operation by allowing them to be dynamically resized, reoriented, translated, etc. while remaining active subject to user control. For example, a blind slider control might be reoriented, or rescaled by one type of input (e.g., pinching or rotating input pointers) and yet remain able to be actuated by linear movement of input pointers.

In some embodiments, each blind control is instantiated as an object instance of a corresponding class when summoned. In other embodiments, explicit control or widget-like objects need not be used. That is, in some embodiments, each blind control is an implicit object that is a set of behaviors simulated by a mapping function that maps control gestures to output values. The module that implements the blind gestures may have monolithic functionality that maps the control input gestures for all types of blind controls to corresponding outputs. Such a module might also recognize and implement other types of global gestures.

Any type of logical or geometric mapping functions may be used to map a user's control manipulations (swipes, taps, rotations, dwells, etc.) to corresponding control outputs. Any type of input range may be mapped to a continuous or discrete output domain. In the first example, drags of the blind slider might map to a domain of [1 . . . 100]. In the second example, rotation of the blind dial might map to $\{\infty, -\infty\}$, perhaps with logarithmic increases in scale. In the third example, the spinwheel might have rotational momentum and might snap and map to angular segments of the spinwheel, e.g., 0-90° maps to "1", 91-190° maps to "2", 191-270° maps to "3", and 271-360° maps to "4". The mapping function maps an input domain of gestural features to an output domain such as a range of discrete or continuous values. In other embodiments discussed below, a blind control might map an input domain to high-level functions with a global nature, for instance cut-and-paste functions.

In some embodiments, such as the third example, the blind control can be reconfigured during its manipulation by the user. For instance, if the dwell-points of the third example are moved in a way that does not spin the spinwheel, then the blind spinwheel is correspondingly reoriented, resized, etc. If two pointers are used to turn the blind dial, then the blind dial can be resized by changing the distance between the two pointers. In some cases, rescaling a blind control will change the ratio of physical manipulation movements to logical movement of the blind control. That is, the granularity of a control can be adjusted dynamically while the control remains operable and without changing the mode of actuating or manipulating the control. Repeating a blind invocation gesture with different parameters can be handled by moving/reorienting/resizing the original control to, in effect, overwrite the original control.

Referring to FIG. 4, a dismiss step 168 is performed to deactivate or dispose of a blind control. Dismissal may be implemented as a time-out feature after lack of interaction, as a side effect of detecting input of a new blind gesture, responsive to an explicit dismissal gesture (e.g., a traced "X" dismisses any blind control), and so forth.

Figure 5:
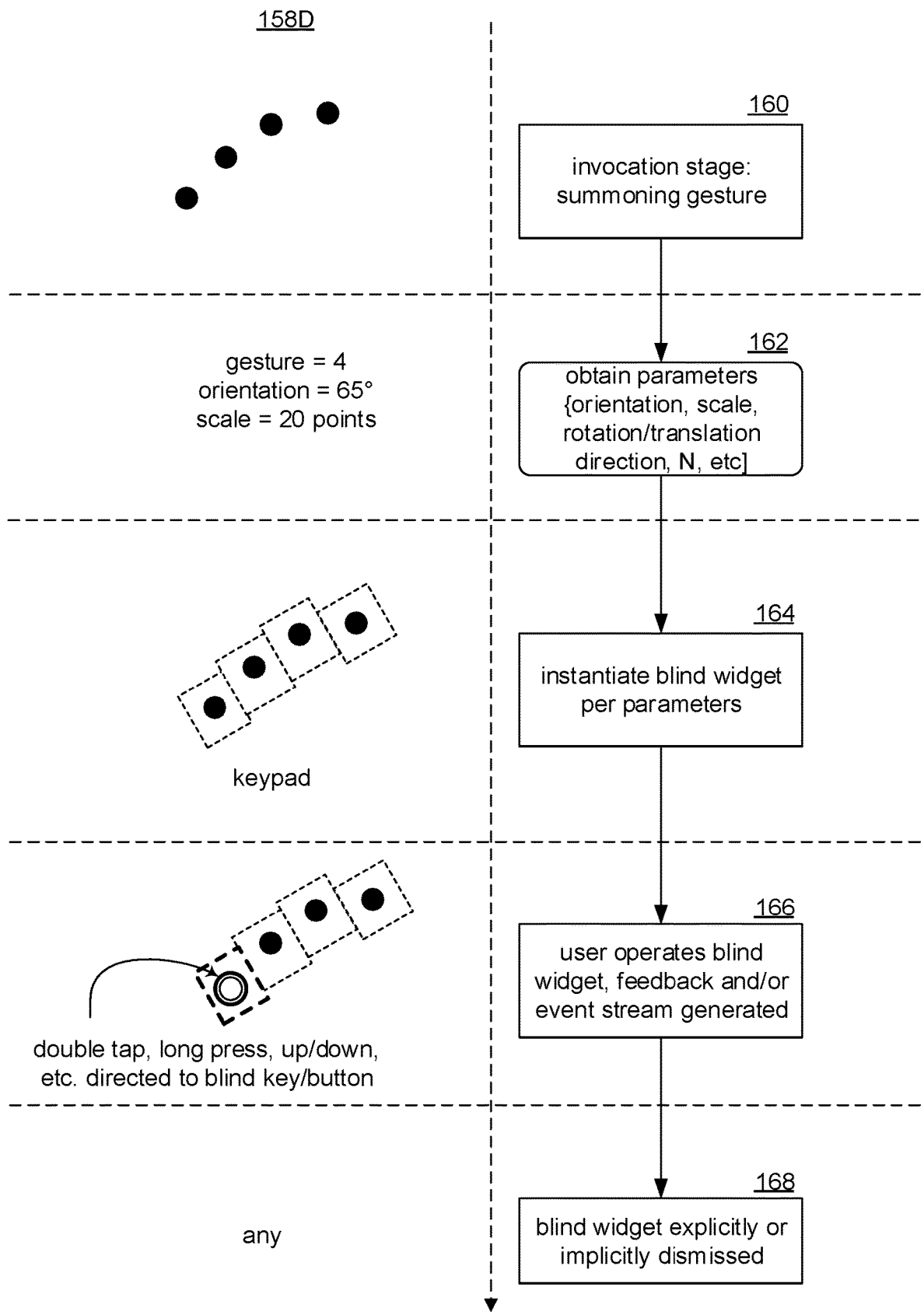
FIG. 5 shows another example of a blind widget.

FIG. 5 shows another example blind widget 158D. In this fourth example, an N-finger dwell (e.g., N is four) at the invocation stage 160. At the next stage 162 the orientation of the invocation gesture is determined and at the instantiation stage 164 a virtual blind keypad or button-set is activated or instantiated according to the orientation of the invocation gesture. In this example, the blind control is a set of buttons oriented and perhaps relatively positioned to correspond to the invocation dwell points. The virtual keys or buttons may be toggle switches, activatable buttons that emit (or not emit) events while being contacted (or not contacted), or emit events when their contact state changes (e.g., "up" and "down" events), etc. In another embodiment, the blind widget might be a set of spinwheels or sliders, each instantiated and assigned to a respective instantiation pointer/finger. That is, the keys of the fourth example blind widget 158D might instead be respective spinwheels each operated by a different finger. In one embodiment, the number of sub-controls is determined by the number of contact points used to summon the control.

In some embodiments, a blind widget is implemented to perform high level functions that might be applicable to many types of applications. For example, a blind widget might be a media playback control and may be implemented in a manner similar to the keypad example discussed above. A blind widget might be a cut-and-paste tool with copy, cut, and paste functions assigned to different blind keys or controls. A blind control might be a set of blind buttons or activation areas that correspond to generic media playback operations. In the example of multiple spinwheels, each spinwheel might correspond to a font setting such as size, font face, and style. In other embodiments, blind controls are implemented to simulate a virtual input device such as a mouse, a touch sensitive surface, or others, but scaled and/or oriented according to the summoning parameters.

FIG. 6 shows a table 190 of other examples of blind gestures. Each row corresponds to a different class of gestures. In one embodiment, the features and behaviors are composeable to produce a greater variety of possible permutations. In other words, particular invocation gesture features, invocation parameters, and control gesture features can be combined in consistent ways. For instance, a number of summoning pointers may always control a number of controls invoked. A summoning pattern such as N concurrent taps, N concurrent dwells, or a sequence of N single taps, may always invoke a particular type of control and/or mode of manipulation. Summoning orientation may be interpreted to always define an orientation of operating the correspondingly summoned blind control.

Figure 7:
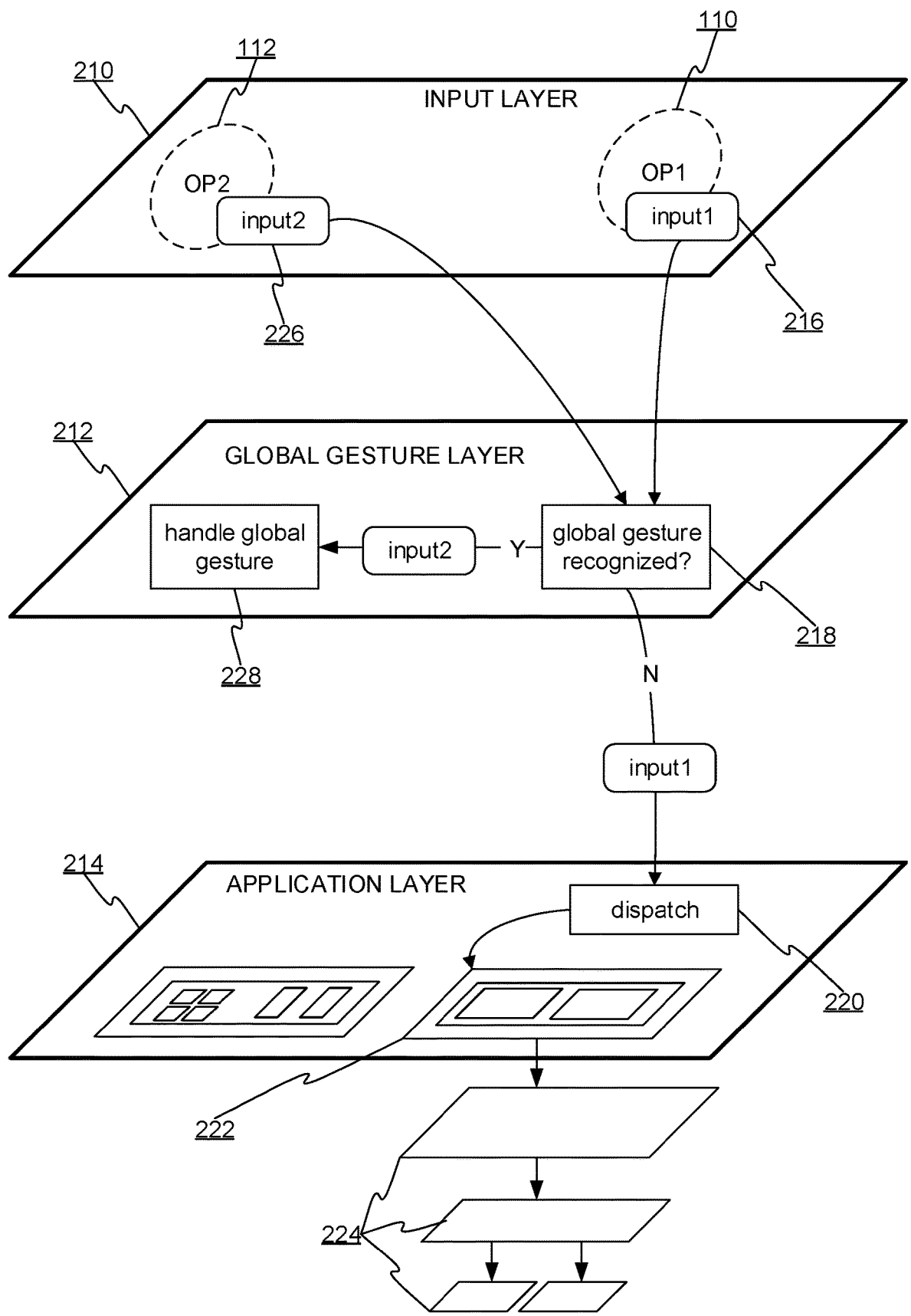
FIG. 7 shows how blind gestures can be implemented to have global precedence.

FIG. 7 shows how blind gestures can be implemented to have global precedence. The layers shown in FIG. 7 roughly correspond to an operating system input layer 210, a gesture processing layer 212, and an application layer 214. As mentioned above, many operating systems handle input and graphics in hierarchical fashion by generating input and graphic events or messages ("messages" for short) at the input layer 210. A message is typically generated by the operating system and passed down through a hierarchy of clients/listeners (typically applications) until one decides to handle the message, which, depending on how the event is handled, may or may not block further propagation of the message.

In FIG. 7, initially a user is manipulating input hardware using their dominant hand. A first touch message 216 ("input1") is passed to the global gesture layer 212 and a gesture recognizer 218 determines if the touch is for a global gesture. For convenience, only a single message is mentioned, although in practice a stream of messages will be generated and analyzed. The first touch message 216 is then passed to a dispatcher 220 which determines which application should receive which messages. Generally, whichever application 222 is "under" the input receives the input. The input is passed through a hierarchy of user interface elements 224 of the application 222. The first operation 110 is carried out by the first touch message 216.

While the first operation 110 is under way the user uses their non-dominant hand to input additional input in correspondence with a second region of the display where the second operation 112 is to occur. The input layer 210 outputs a corresponding second touch message 226 (in practice, multiple messages), which is received by the gesture recognizer 218. The gesture recognizer 218 recognizes this input as a blind gesture. The input is passed to a global gesture handler 228 which summons the appropriate blind control, generates a notice for the dispatcher 220, and so on. The application 222 in turn takes any steps necessary to associate the summoned blind control with the first operation 110. Even as the second input is being inputted by the user's non-dominant hand, the dominant hand can continue to be provide the first input for the first operation.

Figure 8:
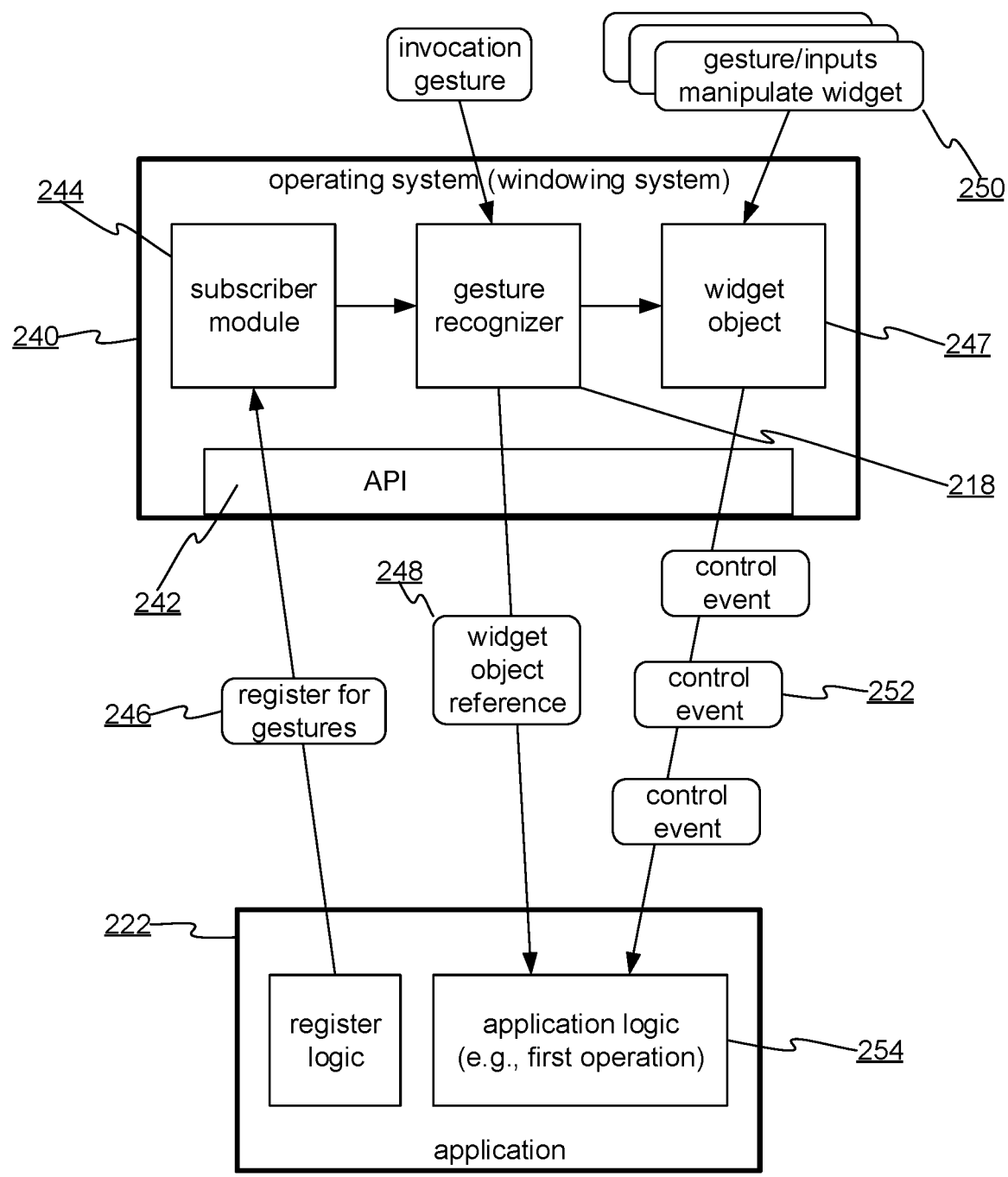
FIG. 8 shows details of how blind gestures are handled and shared with applications.

FIG. 8 shows details of how blind gestures are handled and shared with applications. An operating system 240 or other component implementing blind gestures provides an application programming interface (API) 242. The API 242 is available to any arbitrary applications to hook into the global blind gestures. In one embodiment, a publish-subscribe model is implemented. The operating system 240 has a subscriber module 244 that tracks which applications are registered for blind gestures. The application 222 has code that issues a call to the API to pass in a request 246 to register for blind gestures. The subscriber module 244 maintains a list of registered applications or objects. Each time the gesture recognizer 218 recognizes a blind gesture, the subscribed applications receive a notification of the correspondingly activated blind widget object 247 in the form of a reference 248 to the object. In one embodiment, only an active application receives the notification. Alternatively, each application receives the notification according to their Z-ordering or the like and has precedence to act on the notification. In another embodiment, applications register event listeners to be notified when a blind gesture occurs.

As the control stage of a recognized blind gesture is entered, user inputs 250 manipulate the blind widget object 247 resulting in corresponding control events 252 being issued to the subscribed application 222. The control messages or events 252 may convey any type of information from the corresponding blind widget object 247. The types of messages or events may be those typically generated by known types of user interface controls, i.e., button up/down events, scroll events, selection events, state change events, value updates (e.g., a new value within a range of a control), control signals such as "play", "stop", etc., affine transforms, etc. Application logic 254 of the application 222 receives and acts on the control events 252 possibly by modifying, controlling, or augmenting the first operation.

Some types of blind controls may not issue control events and may only be graphically associated with a first operation or region. For example, some blind controls may be passive and only provide helpful information or assistive graphics. The association with the first operation may be only one of proximity where the graphic provided by the blind control is automatically positioned on the display based on the location of the first operation, a location of the corresponding application, or some other location associated with the dominant hand, for instance a position of an input pointer (contact point) of the dominant hand, a last known previous position of the user's dominant/other hand, the location of the foreground application, the location of the user's gaze as determined by a gaze tracking system, etc. Put another way, in some embodiments, rather than an application specifically integrating with the blind control (e.g. by subscribing to events, interpreting messages, etc.), the application is not aware of the existence of blind controls and the module implementing the blind controls (e.g., the operating system) handles all of the non-dominant hand input and either provides the blind functionality itself directly (as in the global screen magnifier example of FIG. 14) or provides the application with forms of input that the application already understands (e.g. ink properties in the line drawing example of FIG. 9, which are the same as ink properties changed through other non-blind means).

Figure 9:
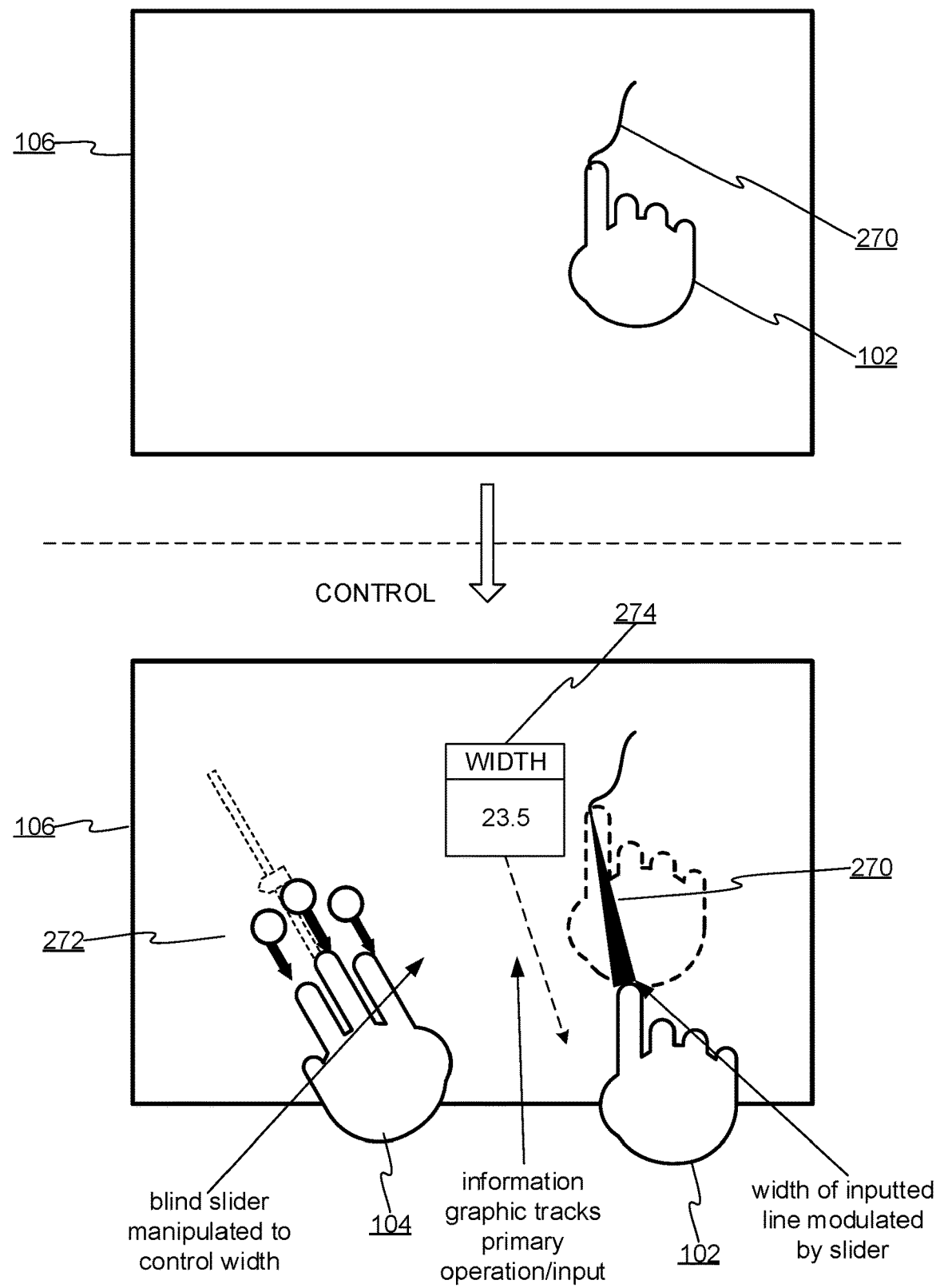
FIG. 9 shows a first example of use of a blind control.

FIG. 9 shows a first example of use of a blind control. Initially, at the upper half of FIG. 9, a graphics editing application is active and the dominant hand 102 is inputting a free-form line 270 by moving a touch point. A blind slider control 272 has been summoned and is shown in the control stage at the lower half of FIG. 9. The application is linked to the blind slider control 272 by receiving a notice of the summoned control and binding the blind slider control 272 to a width property of the line 270. The dashed representation of the blind slider control 272 indicates that the graphic may or may not be displayed. An information graphic 274 of the slider is displayed at a location based on a location of the touch point and may move with the movement of the dominant hand's touch point. As the non-dominant hand 104 manipulates the blind slider control 272 by moving three touch points in a direction paralleling the slider's orientation, scalar values generated by the slider are passed to the application and per the binding the values provided by the slider change the width of the line 270. The current width setting blindly controlled by the non-dominant hand 104 is displayed in the information graphic 274. As the blind slider is moved downward the width of the line 270 increases.

Figure 10:
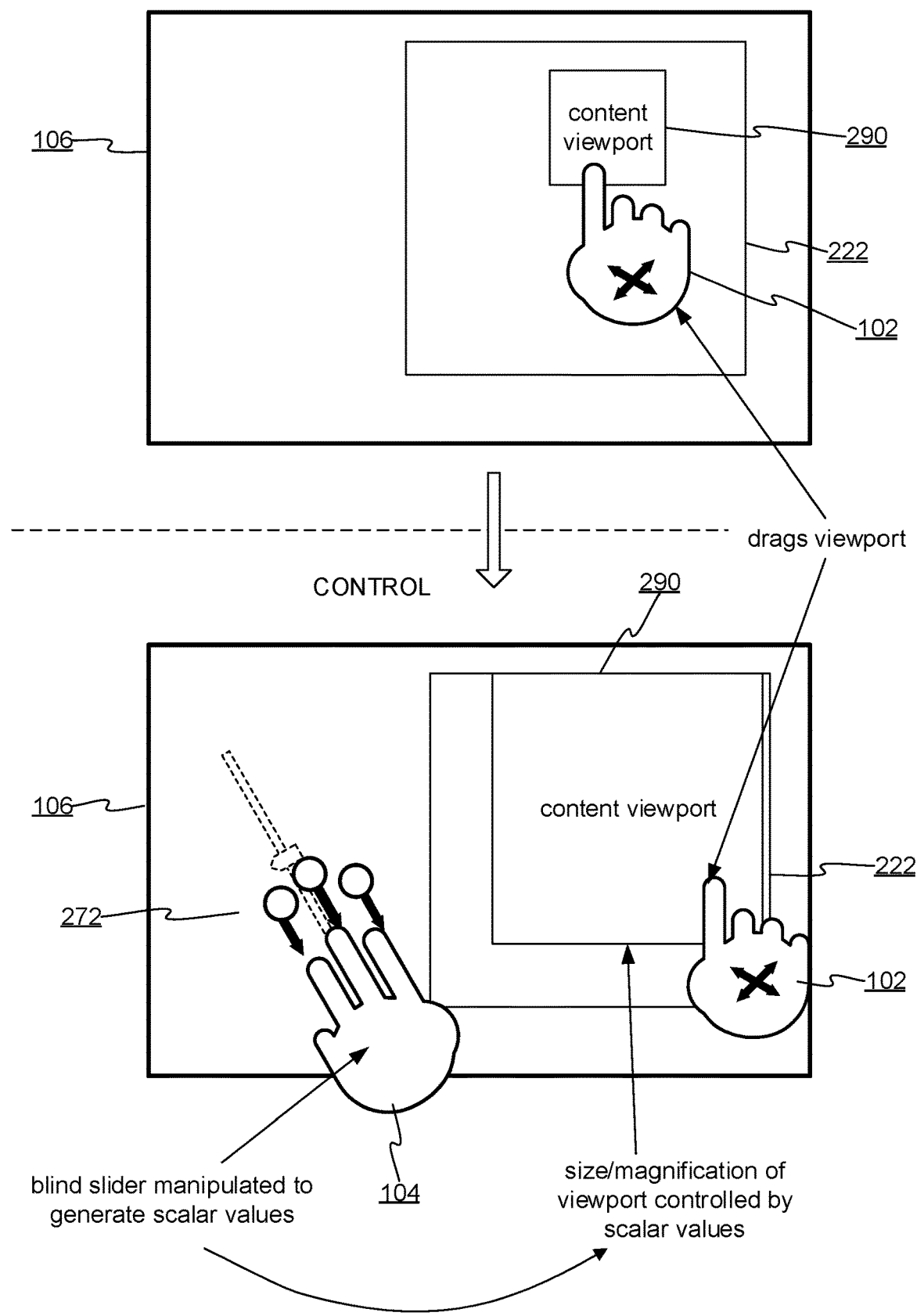
FIG. 10 shows a second example of use of a blind control.

FIG. 10 shows a second example of use of a blind control. The application 222 in this example is a mapping program. The dominant hand 102 has opened a viewport 290 to a map. The viewport 290 may be a magnification of an encompassed region of the map, a summary of map data within the encompassed map region, an enhancement such as a topographic overlay displayed only in the viewport, etc. The viewport 290 is dragged by the dominant hand 102. The blind slider control 272 is associated with the viewport 290. In this case the scalar value set by the slider controls the size of the viewport 290. Thus, with the dominant hand the user is able to drag the viewport 290 and with the non-dominant hand the user is able to continue looking at the viewport while simultaneously controlling the size of the viewport 290 with the non-dominant hand.

Figure 11:
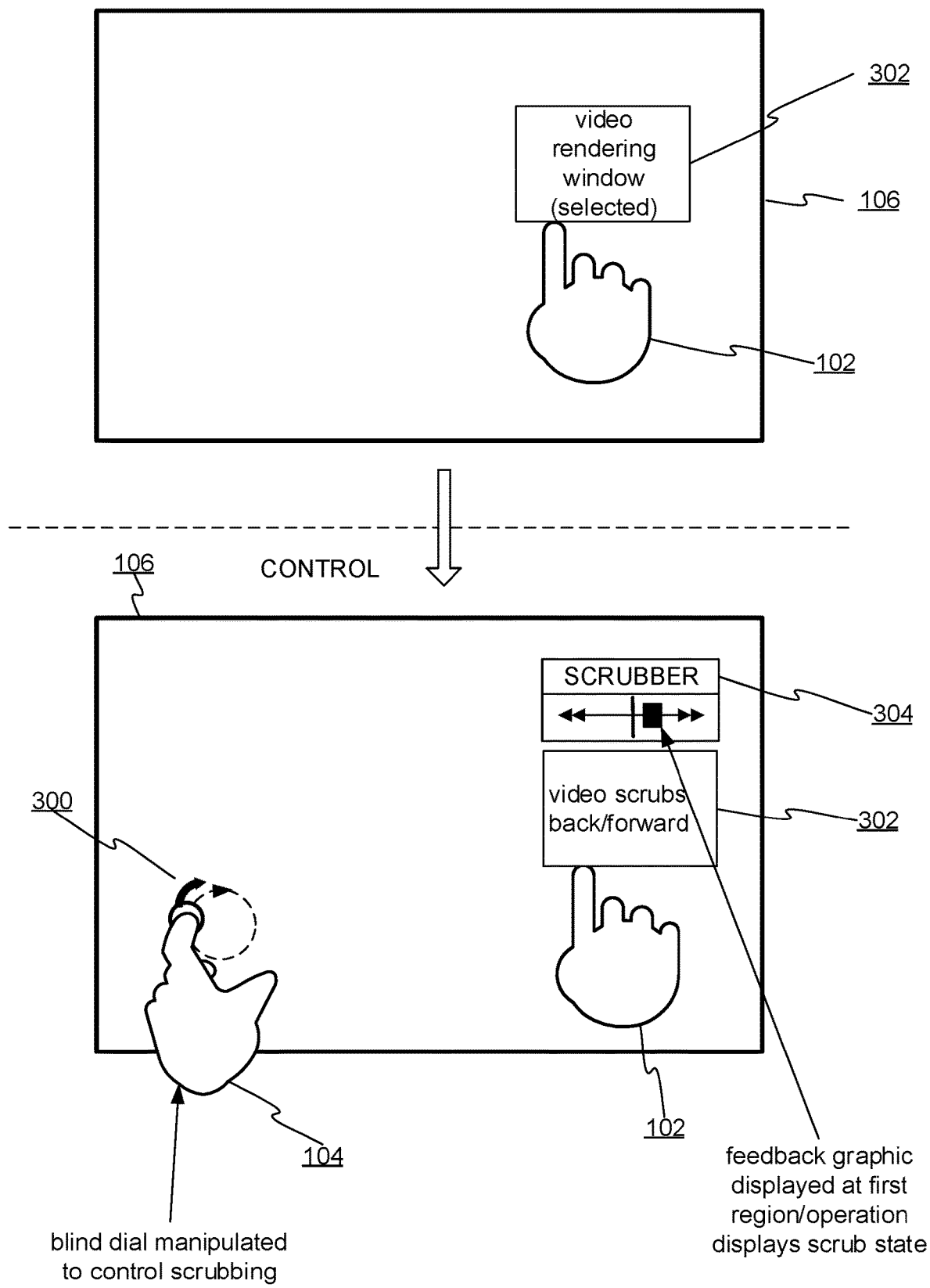
FIG. 11 shows a third example of use of a blind control.

FIG. 11 shows a third example of use of a blind control. In this example, a blind dial control 300 has been summoned. An application in full-screen mode has opened a video rendering window 302. The dominant hand 102 provided input to open the video rendering window 302. The dominant hand 102 might be dormant or interacting with the video rendering window 302. The blind dial control 300 is associated with the video rendering window 302. Specifically, the blind dial control 300 controls a scrubber 304 activated by the application in response to being notified of the summoning of the blind dial control 300. As the blind dial control 300 is rotated by a finger of the non-dominant hand 104, the scrubber 304 responsively scrubs the video forward and backward according to the direction and amount of rotation of the blind dial control 300.

Figure 12:
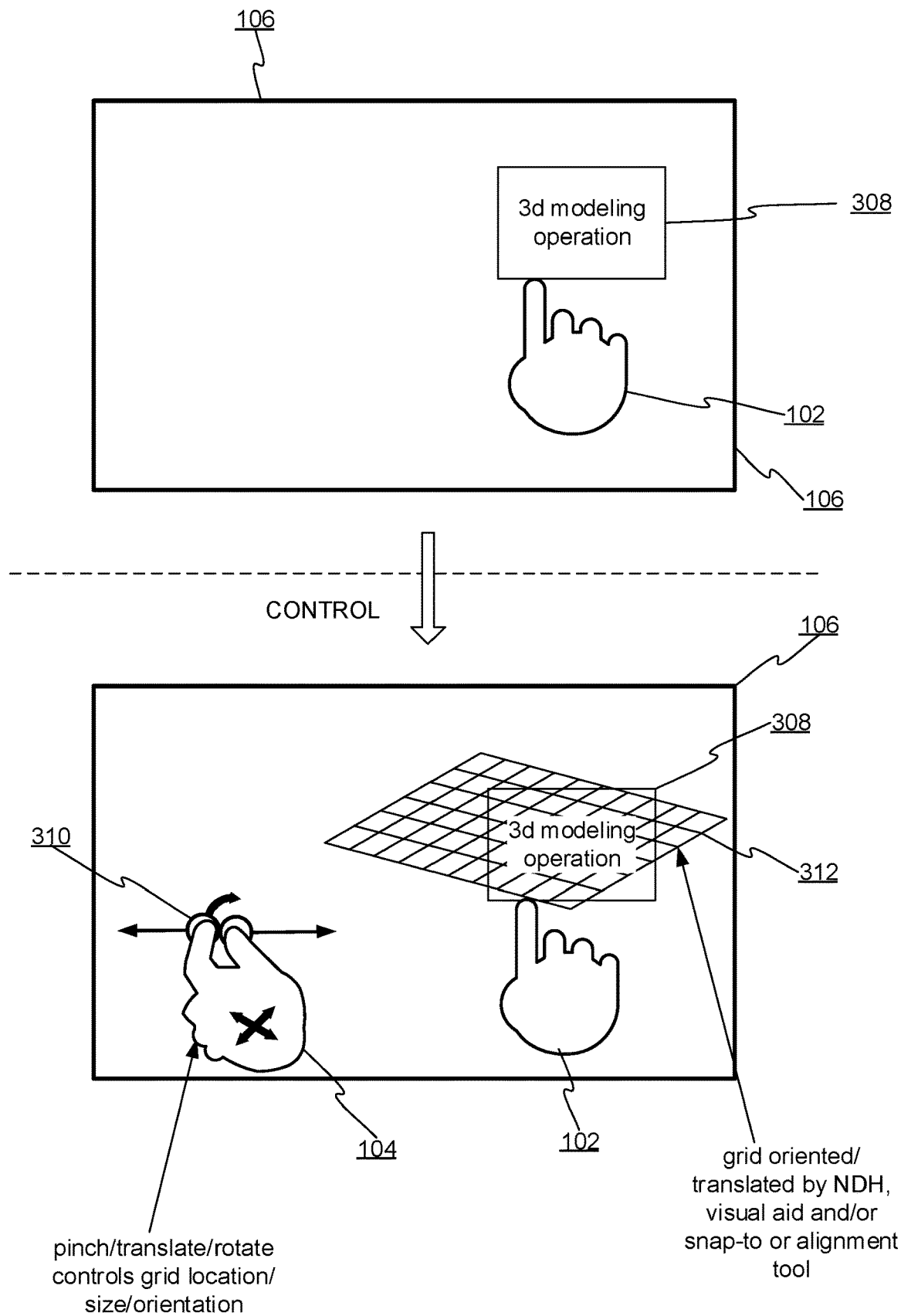
FIG. 12 shows a fourth example of use of a blind control.

FIG. 12 shows a fourth example of use of a blind control. A 3d modelling application is displaying a modeling operation 308, for instance, a tool for applying textures to a model or interactively creating a 3d mesh model. A blind transform control 310 has been summoned and activated. The blind transform control interprets movements of contacts of the non-dominant hand 104 into affine transforms, i.e., translations, rotations, and/or scalings. A grid tool 312 is correspondingly transformed on the display 106 by the blind transform control. The grid tool 312 might functionally augment the modeling operation 308, for instance by snapping moved/inputted points of the 3d mesh model to the grid. In another embodiment, the grid has no functional interaction with the application. The graphic controlled by the blind control can be initially positioned relative to the 3d modeling operation 308, centered on a contact of the dominant hand 102, centered on the 3d mesh model, or any other point of interest that is independent of the inputs provided by the controlling non-dominant hand 104.

Figure 13:
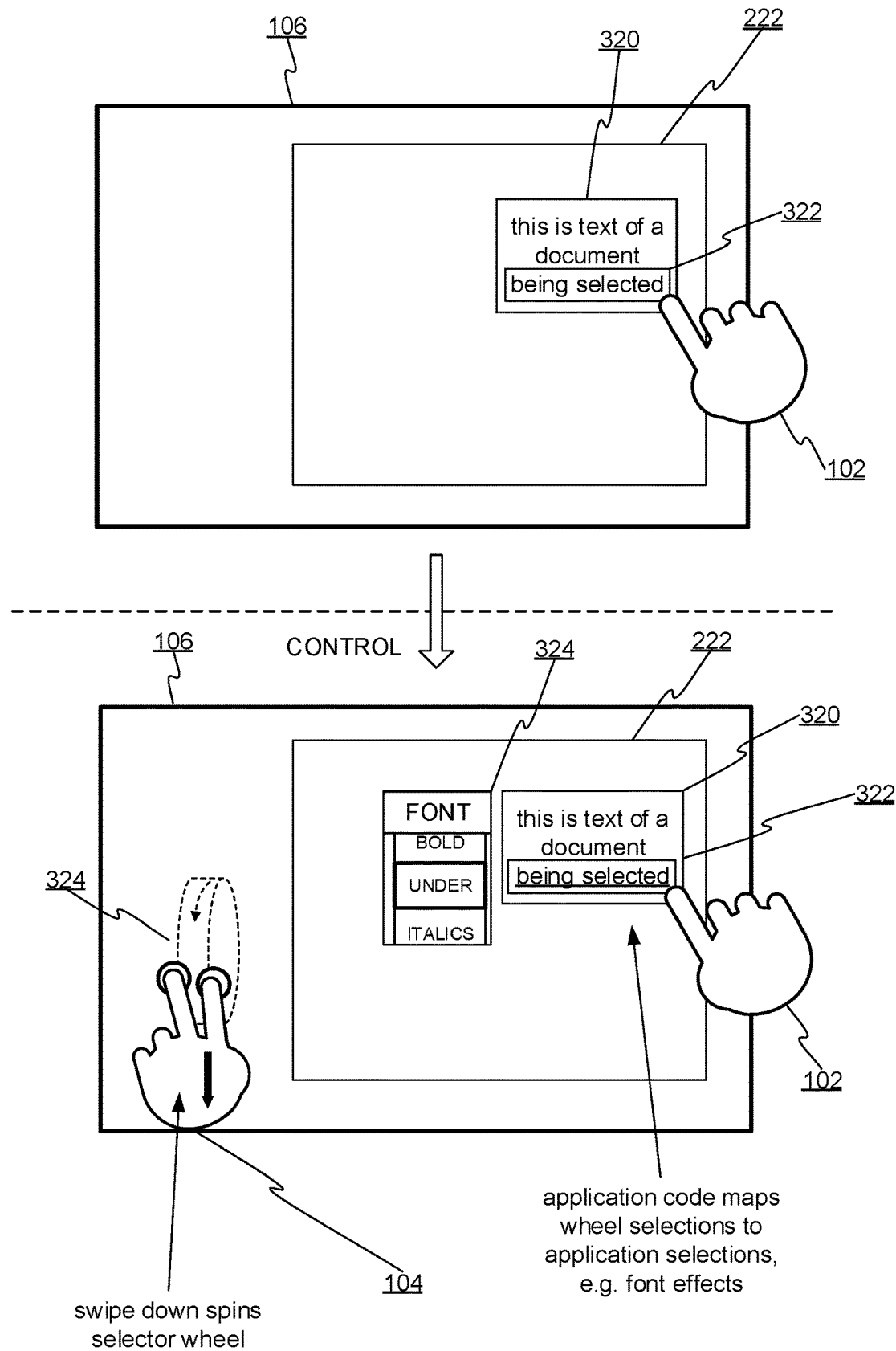
FIG. 13 shows a fifth example of use of a blind control.

FIG. 13 shows a fifth example of use of a blind control. In this example, the application 222 has a text editing object 320. The dominant hand 102 is interactively selecting a portion of text 322. Or, the portion of text 322 has been recently selected. In either case, an editing operation not associated with the non-dominant hand 104 is in progress. In the lower half of FIG. 13 a blind summoning gesture has summoned a blind spinwheel control 324. The application 222 has associated or bound the control to a font-style property of the text editing object 320. The non-dominant hand 104 provides values to the application, and the application maps the selection values to settings of the font-style property. If the control outputs values from "1" to "100", then the application might map "1" to "25" to a first font style, "26" to "50" to a selection style, etc. If the control outputs an open-ended range of values the values can be mapped to discrete options by taking moduli of the values. Optionally, a graphic indicator 324 of the currently selected font-style is displayed relative to a location related to the portion of text 322, the text editing object 320, or some other point of interest related to the user's dominant-hand activity instead of the location of summoning and controlling the blind spinwheel control 324.

Figure 14:
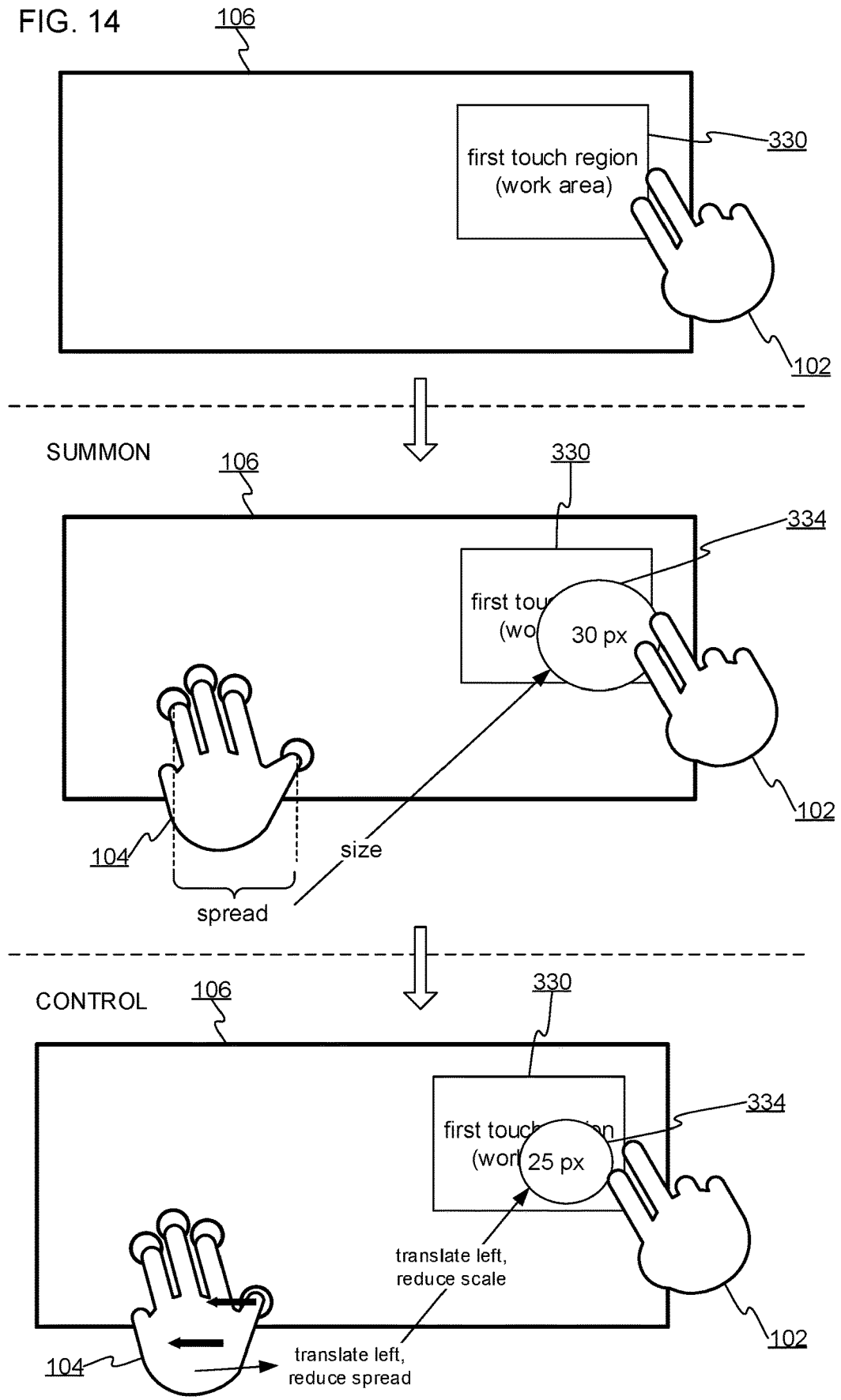
FIG. 14 shows a sixth use of a blind control and the possible relationship between a parameter of a summoning gesture, a parameter of a subsequent control gesture, and an operation being performed by the dominant hand.

FIG. 14 shows a sixth use of a blind control and the possible relationship between a parameter of a summoning gesture, a parameter of a subsequent control gesture, and an operation being performed by the dominant hand 102. Initially, the dominant hand 102 is manipulating a first work area 330 (e.g., translating, editing content, scaling, scrolling, etc.). A four-finger summoning gesture is inputted by the non-dominant hand 104. A scale of the summoning gesture is determined based on a distance between the outermost summoning input points, e.g., 30 pixels (the "spread" shown in the middle portion of FIG. 14). The summoning gesture summons a magnifier 334 initialized with the scale of the summoning gesture. In this example, the application is only passively involved and does not communicate with the blind control. Rather, the summoned graphic—the magnifier 334—is provided by the blind control instead of the application.

The module that recognizes the blind gesture and manages the blind control also has a placement component to determine initial placement of the magnifier 334. The placement component may select a placement location based on: a location of a contact point that preceded or is concurrent with the input of the summoning gesture (perhaps continuing during the summoning gesture), a determination of a most recently active application or user interface element, a particular type of user interface element, a user interface element with a property that indicates that it is a potential summoning target, a secondary hardware signal such as a proximity signal indicating proximity of the non-summoning hand, a type of content being displayed, a list of applications that have self-registered for the particular blind control (possibly prioritized based on recent use or Z-order), and so forth. Any type of graphical or semantic feature that has a display location and which is generally independent of the location of the summoning gesture can be used as a basis for determining the affinity of a summoned blind control. A heuristic approach balancing multiple factors may also be used. In yet another embodiment, after a blind control has been summoned a brief window of time can be provided to accept any next touch input as a point for placing the summoned control. If no such input is provided, then an automatic placement occurs.

During the control stage shown at the bottom of FIG. 14, the hand that summoned the magnifier 334 translates to control translation of the magnifier 334. Changing the spread of the outermost fingers rescales the magnifier 334. For instance, the thumb and ring finger shown in FIG. 14 move closer together and the magnifier 334 is reduced to 25 pixels. In another embodiment, the primary hand might be able to drag the magnifier 334 when it appears while the secondary hand might control the size (by translation of the secondary hand) and magnification factor (by spread) of the magnifier 334. In other words, the blind control might have a graphic that is concurrently controlled in one way by one hand while being controlled in another way by another hand.

FIG. 14 highlights embodiments in which blind controls do not depend on applications or other software to associate with a first operation or region. Any of the examples or embodiments described above can be implemented as global tools that self-attach to supplement primary operations that are unaware of the supplementation.

Other forms of feedback besides graphics can be used. For example, haptic or audio feedback can be used to signify summing events, manipulations of a blind control, and/or dismissals, which is consistent with the design objective of not requiring a user to shift their visual attention away from the primary task.

Preferably, as discussed above, the blind controls are summoned and controlled at a control plane that lies "above" applications or other user software. A blind control can be summoned and manipulated with user input directly atop an application. To reiterate, some blind controls do not require continuous input from summoning to control.

As can be seen from the descriptions of the embodiments above, the embodiments provide an improved mode of interacting with a computing device by improving utilization of input/output devices and their states in cooperation with a gesture performed by a second hand to optimize or augment a graphical user operation being performed by a first hand.

Figure 15:
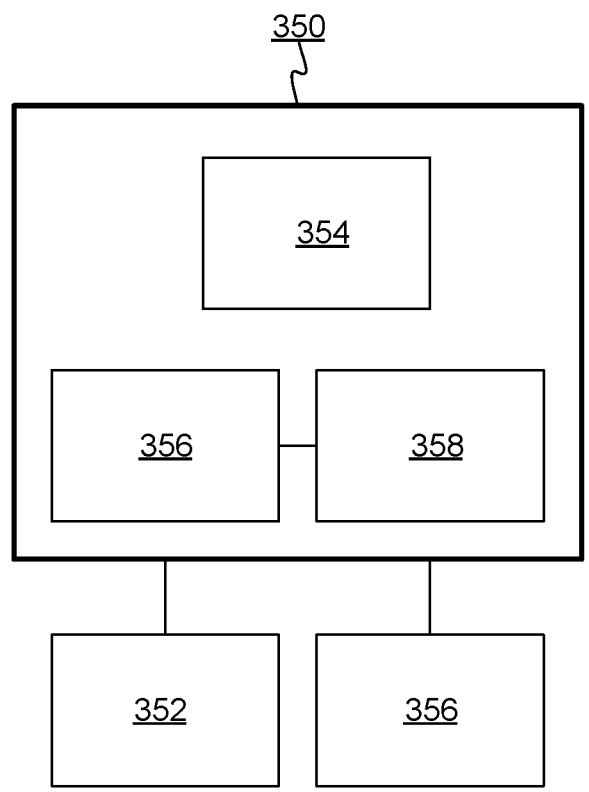
FIG. 15 shows details of a computing device.

FIG. 15 shows details of a computing device 350 on which embodiments described above may be implemented. The technical disclosures herein will suffice for programmers to write software, and/or configure reconfigurable processing hardware (e.g., field-programmable gate arrays), and/or design application-specific integrated circuits (application-specific integrated circuits), etc., to run on the computing device 350 to implement any of features or embodiments described herein.

The computing device 350 may have one or more displays 106, a network interface 354 (or several), as well as storage hardware 356 and processing hardware 358, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 356 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 300 may cooperate in ways well understood in the art of computing. In addition, input devices may be integrated with or in communication with the computing device 300. The computing device 300 may have any form-factor or may be used in any type of encompassing device. The computing device 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any current or means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device comprising storage hardware, processing hardware, a display, and an input device, the method comprising:
   while a graphical user control displayed at a first region of the display is being interactively manipulated by first inputs from a first hand that is providing the first inputs via the input device at the first region of the display:
   recognizing a gesture from second inputs inputted by a second hand, wherein the gesture is recognized without regard for location of the graphical user control,
   determining a value of a characteristic of the gesture of the second hand; and
   responding to the recognition of the gesture by:
      invoking a corresponding user interface (UI) control wherein the UI control is configured according to the value of the characteristic of the gesture; and
      associating third inputs provided by the second hand to the UI control with the graphical user control being interactively controlled by the first inputs inputted by the first hand, wherein the gesture is initially recognized as such based on invocation features of the second inputs that are independent of the orientation and scale of the gesture, and wherein the graphical user control is concurrently controlled by both the first inputs and the third inputs based on the third inputs being associated with the graphical user control according to the recognition of the gesture.

2. A method according to claim 1, wherein the recognizing the gesture is performed regardless of which arbitrary applications are executing when the gesture is recognized.

3. A method according to claim 2, wherein the third inputs are able to be associated with any of the arbitrary applications.

4. A method according to claim 1, wherein the third inputs associated with the graphical user control are interpreted based on an orientation or scale of the gesture and not based on a location of the gesture.

5. A method according to claim 1, further comprising applying the third inputs associated with the graphical user control at a location based on a location of the graphical user operation.

6. A method according to claim 1, wherein an application displaying the graphical user control receives events or messages corresponding to the third inputs associated with the graphical user control.

7. A method performed by a computing device comprised of input hardware, a display, storage hardware, and processing hardware, the method comprising:
   while a graphical user control displayed at a first region of the display is being interactively manipulated by first inputs from a first hand that is providing the first inputs via the input device at the first region of the display:
   responsive to receiving second user input inputted by a second hand at a summoning location of the display, recognizing the second user input as a summoning gesture for summoning a corresponding user interface control;
   determining a value of a characteristic of the second user input; and
   based on the recognizing of the summoning gesture, invoking the corresponding user interface control and associating third user input received by the user interface control with the graphical user control being manipulated by the first hand, wherein the third user input is inputted by the second hand at the summoning location, wherein the invoking the user interface control comprises activating the user interface control and configuring the user interface control to be operated by the third user input according to the value of the characteristic of the second user input, and wherein the user interface control, while being operated by the third user input, comprises a graphic representation displayed at a location of the display other than the summoning location, wherein the location is not dependent on the summoning location of the second user input.

8. A method according to claim 7, further comprising recognizing the summoning gesture while third user input is being inputted to control an operation displayed on the display, the operation being controlled and displayed before the first user input is inputted.

9. A method according to claim 8, wherein the value of the characteristic of the gesture comprises at least one of an orientation, a scale, or a number of distinct input pointers and the value comprises at least one of an orientation value, a scale value, or the number of distinct input pointers.

10. A method according to claim 9, wherein the orientation or scale of the user interface control dynamically adapts to the orientation or scale of the second user input.

11. A method according to claim 7, the method further comprising providing an application programming interface (API) through which applications are able to request notifications corresponding to activations or instantiations of the user interface control.

12. A method according to claim 11, wherein the API allows the applications to receive events and messages generated by the user interface control responsive operation thereof by the second user input.

13. A method according to claim 7, wherein an operating system performs the method, wherein the graphic representation or a function of the user interface control is provided by the operating system, the method further comprising the operating system, not the application, associating the graphic representation or the function with the location.

14. A computing device comprising:
  input hardware;
  a display;
  processing hardware; and
  storage hardware;
  the storage hardware storing instructions executable by the processing hardware, the instructions configured to perform a process, the process comprising:
    while an object displayed at a display location is being interactively manipulated by first inputs from a first hand that is providing the first inputs via the input device at the display location:
    allowing summoning gestures to be recognized for second user inputs entered above arbitrary applications by a second hand and based on recognition features of the second user inputs that do not depend on orientation or scale of the second user inputs;
    determining a value of a characteristic of the second user inputs;
    when a summoning gesture is recognized for a second user input, automatically causing a corresponding user interface control to be summoned and configured, based on the value of the characteristic of the second user inputs, for subsequent user-manipulation by a third user input provided by the second hand: (i) at a display location of the user input location of the display and (ii) at a display scale and orientation of the user input; and
    automatically associating a functional and graphical manifestation of the user interface control with the object displayed at the display location, wherein the associating does not depend on the display location of the user input, wherein the third user input at the display location manipulates the user interface control while the user interface control is associated with the object at the display location that does not depend on the display location of the user input, and wherein manipulation of the user interface control controls a corresponding operation on the object.

15. A computing device according to claim 14, wherein the user interface control does not comprise a graphical manifestation on the display.

16. A computing device according to claim 14, wherein the configured display scale or orientation of the user interface control is configured to dynamically change according to changes to the display scale or orientation of the user input.

17. A computing device according to claim 14, wherein the instructions comprise an operating system executable by the processing hardware, the operating system configured to determine whether the user inputs correspond to the summoning gesture regardless of the display locations where the user inputs are inputted.

18. A computing device according to claim 14, the process further comprising receiving the user input inputted by a first hand of a person while another user input is being inputted by a second hand of the person, and automatically manifesting the functional or graphical manifestation based on the user input inputted by the second hand.

19. A computing device according to claim 18, the process further comprising causing the functional or graphical manifestation to automatically track the second user input.

20. A computing device according to claim 14, the process further comprising mapping user inputs that manipulate the user interface control to corresponding control events received by an application comprised of the object.

* * * * *